United States Patent [19]

Valsamis et al.

[11] 4,389,119
[45] Jun. 21, 1983

[54] ROTARY PROCESSORS

[75] Inventors: Lefteris N. Valsamis, West Haven, Conn.; Zehev Tadmor, Haifa, Israel

[73] Assignee: USM Corporation, Farmington, Conn.

[21] Appl. No.: 336,936

[22] Filed: Jan. 4, 1982

[51] Int. Cl.$^3$ .......................... B01F 7/02; B01F 7/10; B29B 1/06

[52] U.S. Cl. ..................................... 366/99; 366/307; 366/315; 415/90; 415/102; 425/224; 425/466

[58] Field of Search ................. 366/52, 69, 77, 96–99, 366/136, 230, 231, 243, 262–265, 293, 315, 302–307, 336, 337, 340; 264/85, 349, 176 C; 425/224, 374, 466, 86, 376, 378, 204, 207, 209, 378, 381.2; 415/90, 101, 170 R, 170 B; 72/60, 262, 270

[56] References Cited

U.S. PATENT DOCUMENTS

| | | | |
|---|---|---|---|
| 4,194,841 | 3/1980 | Tadmor | 366/75 |
| 4,213,709 | 7/1980 | Valsamis | 366/76 |
| 4,227,816 | 10/1980 | Hold et al. | 366/99 |
| 4,255,059 | 3/1981 | Hold et al. | 366/97 |
| 4,300,842 | 11/1981 | Hold et al. | 366/315 |
| 4,329,065 | 5/1982 | Hold et al. | 366/97 |

Primary Examiner—Philip R. Coe
Assistant Examiner—Timothy F. Simone
Attorney, Agent, or Firm—John P. Morley

[57] ABSTRACT

Novel, improved rotary processors which include a rotatable element carrying a plurality of annular channels and a stationary element providing a coaxial, closure surface operationally arranged with the channels to provide enclosed processing passages. The so-formed plurality of processing passages provide a highly efficient processing stage particularly for melting polymer material. Each processing passage of the processing stage includes inlet means, outlet means and a channel member associated with the stationary element and arranged and adapted so that material fed to the inlet can be carried forward by the rotatable channel walls to the blocking member for discharge from the passage.

In rotary processors of this invention the clearance between the rotary surface carrying the channels and the stationary coaxial closure surface is relatively wide and permits substantial amounts of material to be interchanged between passages of the processing stage. The interchange provides especially efficient, intensive mixing for material processed in the stage. Also, the interchanged material which passes through the relatively wide clearance can be subjected to conditions of high shear and high temperatures.

19 Claims, 16 Drawing Figures

ROTARY PROCESSORS

BACKGROUND OF THE INVENTION (1) Field of the Invention

This invention relates to processing apparatus. More precisely, this invention relates to rotary processors particularly useful for processing plastic and polymeric materials.

(2) Description of the Prior Art

Rotary processors are known to the art. Details relating to such processors are described in U.S. Pat. Nos. 4,142,805; 4,194,841; 4,207,004; 4,213,709; 4,227,816; 4,255,059; 4,289,319; 4,300,842; 4,329,065 and in commonly assigned, co-pending application Ser. No. 971,332 filed Dec. 20, 1978, now abandoned. All of the above patents and applications are incorporated here by reference.

Essential elements of the basic individual processing passage of rotary processors disclosed in the above patents and applications comprise a rotatable element carrying at least one processing channel and a stationary element providing a coaxial, closure surface operationally arranged to form with the channel an enclosed processing passage. The stationary element has an inlet for feeding material to the passage and an outlet for discharge of material from the passage. A member providing a material blocking and material collecting end wall surface is also associated with the stationary element and arranged near the outlet and adapted to block movement of material fed to the passage and to coact with the moving channel walls to establish relative movement between the blocked material and the moving channel walls. This coaction permits material in contact with the moving walls to be dragged forward to the end wall surface for collection and/or controlled processing and/or discharge.

As disclosed in the above patents and applications, the processing passages present a highly versatile polymer processing capability. The passages are adaptable for effectively performing such polymer processing operations as melting, mixing, pressurizing, pumping, devolatilizing and homogenizing among others as well as adding ingredients to or withdrawing ingredients from materials processed in the passage.

This invention is directed to rotary processors having a novel, improved design which provides special advantages in polymeric processing operations in terms of efficiency, quality of product and overall processing performance characteristics.

BRIEF SUMMARY OF THE INVENTION

Rotary processors of this invention comprise a rotatable element carrying a plurality of annular channels and a stationary element providing a coaxial, closure surface operationally arranged with the channels to provide enclosed processing passages. The so-formed processing passages are designed to provide a plurality of passages providing a processing stage which may be interconnected to another processing stage including passages formed with other channels carried by the rotor. Each processing passage of the processing stage includes inlet means, outlet means and a channel blocking member associated with the stationary element and arranged and adapted so that material fed to the inlet can be carried forward by the rotatable channel walls to the blocking member for discharge from the passage.

An important distinctive design feature of processing stages of rotary processors of this invention involves the clearance between the rotary surface carrying the channels of the processing passages of the processing stage and the stationary coaxial closure surface. In accordance with the invention, the clearance is relatively wide and designed to permit substantial amounts of material to be interchanged between passage of the processing stage. Material interchanged between passages through the relatively wide clearance may be melted, unmelted or partially melted material and material is interchanged over substantially all portions of the circumference of the passage during rotation. The interchange provides especially efficient, intensive mixing for material processed in the stage. Additionally, the interchanged material is passed through a region of the processor capable of generating conditions of high shear and temperatures for effective processing of interchanged material. The effective utilization of this region increases the overall processing surface area of the processor and provides a processing stage of highly improved overall efficiency.

Another important design feature of the improved rotary processor processing stages of this invention involves the provision of a novel leakage material collection channel arranged and adapted to effectively control external leakage of material from the processor and also to improve quality of processed material.

Details relating to the novel rotary processors of this invention as well as the advantages derived from such processors will be more fully appreciated from the Detailed Description of the Preferred Embodiments taken in connection with the Drawings.

DESCRIPTION OF THE DRAWINGS

The invention will be described in connection with the attached drawings in which.

other melting passages 22, 26, and 28. Each passage of the melting stage includes a channel blocking member 48 arranged near outlet 50. Outlets 50 of each passage are preferably spaced apart from inlet 42 a major portion of the circumferential distance about the passage.

Figure 1:
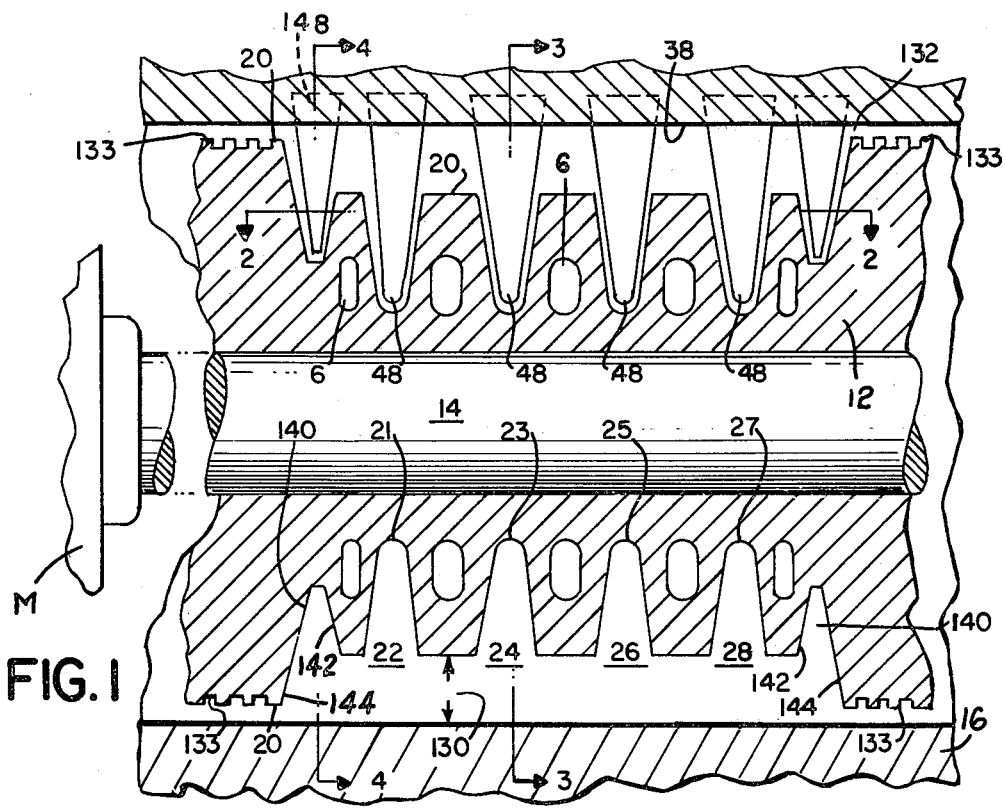
FIG. 1 is a cross-sectional view of a rotary processor including the novel, improved processor stage of the invention.

As shown, (FIGS. 1, 2 and 3), each blocking member 48 provides a material blocking end wall surface 52 for each passage of the melting stage. Accordingly in operation, movement of the main body of material fed to each passage of the melting stage is blocked and relative movement is established between the moving channel walls and the blocked material. The so-established relative movement generates frictional heat at the moving walls and within the body of material. Additionally, the channel walls of the melting stage passages—and preferably all of the channel walls of the processor—are normally heated such as by a heat transfer fluid supplied in known manners to chambers 6 (FIG. 1). Details relating to suitable heating means can be found in referenced U.S. Pat. Nos. 4,142,805 and 4,194,841.

Figure 2:
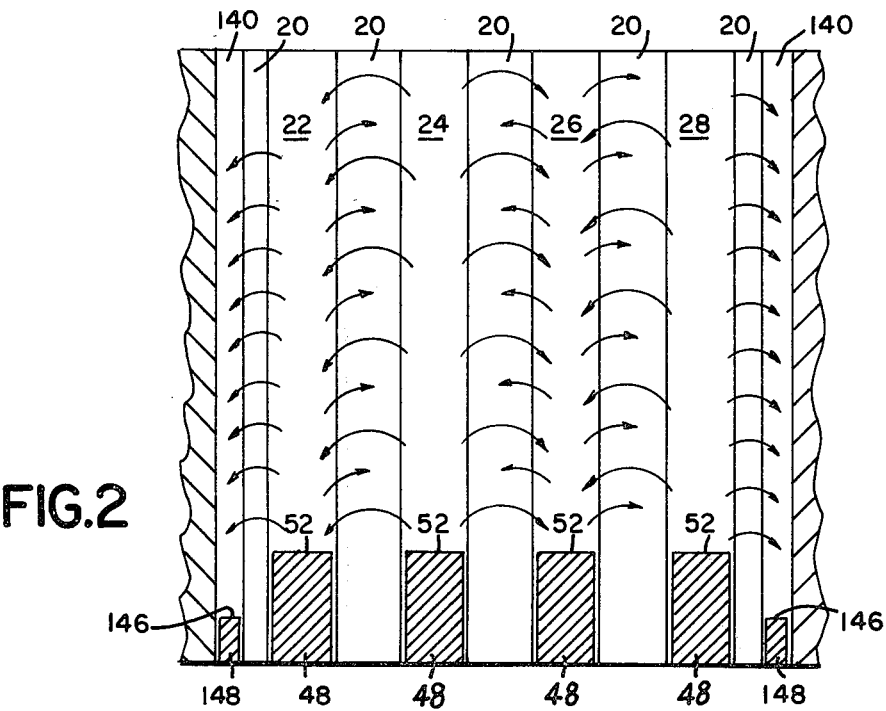
FIG. 2 is a simplified cross-sectional view of the rotary processor illustrated in FIG. 1 taken along line 2—2 of FIG. 1.
Figure 3:
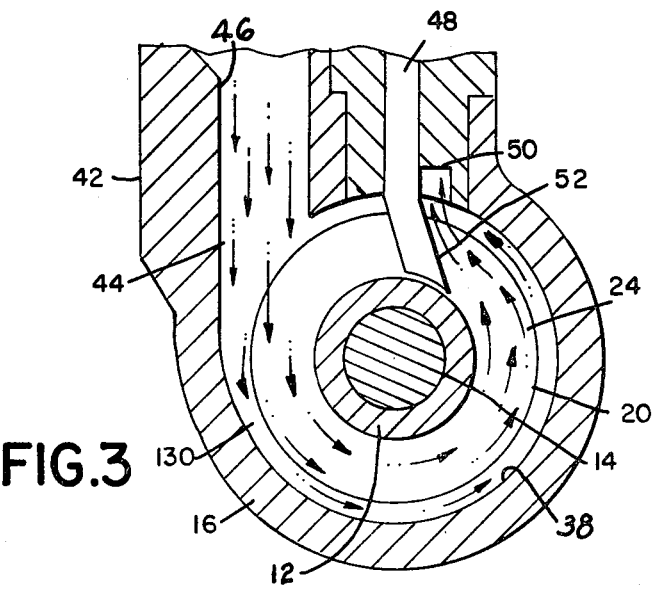
FIG. 3 is a simplified cross-sectional view of a passage of the rotary processor of FIG. 1 taken along line 3—3 of FIG. 1.

Normally, the action of the channel walls in dragging material forward builds up pressure progressively about the passage and maximum pressure in each of the meltof material to be interchanged between melting stage passages. The interchange creates an intensive mixing action which is illustrated in FIG. 2 where arrows indicate the type of flow which can occur at different times to provide the interchange of material between melting stage passages. As shown, there is a forced interchange of a large volume of material to and from the melting stage passages over surfaces 20 between channels 21, 23, 25 and 27.

In addition to providing intensive mixing for processed material, the wide clearances provide additional highly efficient processing surfaces for processing stages of the invention. Under the conditions of the interchange, clearances 130 become regions where conditions of high shear and high frictional heat are generated thereby providing maximized melting conditions for interchanged material. Material interchanged between melting passages through clearance 130 may be melted, unmelted or partially melted material and the interchange occurs over substantially all portions of the circumference of each rotating melting stage passage. Accordingly, rotary processors including improved melting stages of this invention provide a substantially increased melt processing surface area capable of processing polymeric materials under maximized melting conditions.

In the past, relatively wide clearances between rotor surface(s) 20 and closure surface 38 have been avoided. The avoidance has been dictated by the potential for external leakage which as disclosed in the referenced U.S. patents and applications is a potential problem in rotary processors. Normally, seals are employed—particularly the seals disclosed in referenced U.S. Pat. No. 4,300,842—to effectively reduce and control external leakage through relatively close clearances 132 between the rotor and housing end surfaces. However, the use of relatively wide clearances between the rotor and housing presents problems in terms of design, cost and efficiency of seals for controlling external leakage. The melting stages of the present invention provide a special feature designed to effectively reduce and control external leakage in a relatively simple but highly efficient fashion. This special feature is an important improvement which permits effective utilization of relatively wide clearances to provide intensive mixing as well as a substantial increase in highly efficient processing surface area for melting stages of this invention.

Figure 4:
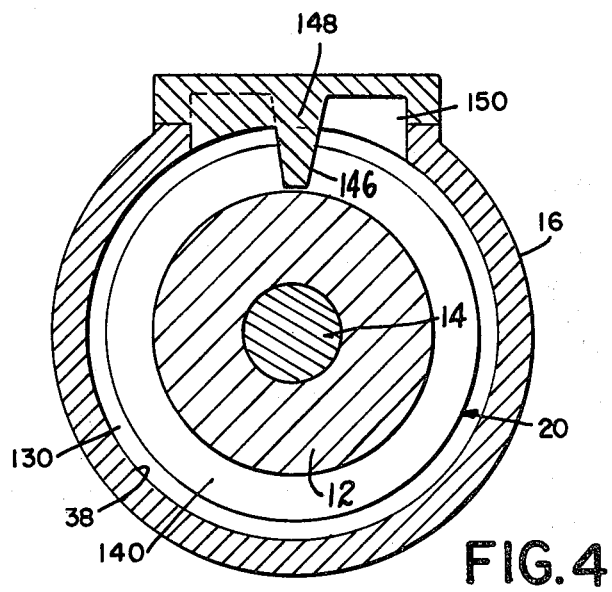
FIG. 4 is a simplified cross-sectional view of a collection channel of the rotary processor illustrated in FIG. 1 taken along line 4—4 of FIG. 1.

As shown in FIGS. 1, 2 and 4, a leakage material collection channel 140 is positioned at each end surface 20 of rotor 12 adjacent passages 22 and 28. Collection channels 140 have walls 142 and 144. At one end of rotor 12, wall 142 of channel 140 communicates with surface 20 extending between channel 21 and channel 140. At the other end, channel 140 communicates with surface 20 extending between channel 27 and channel 140. At both ends of rotor 12, wall 144 of channel 140 extends upwardly above the height of wall 142 and terminates at end surfaces 20 of rotor 12 which provide clearance 132 between surfaces 20 and 38. As shown, (FIG. 1), seals 133 preferably of the type disclosed in referenced U.S. Pat. No. 4,300,842 are carried by surface 20 to seal clearance 132. In the illustrated arrangement and design, material from passages 22 and 28 which passes over surfaces 20 adjacent channels 140 will be collected by channels 140 before the material reaches the region of clearance 132. The preferred collection channels 140 are relatively narrow and are designed to provide efficient pumping for any material collected about the circumference of the channel.

As shown in FIG. 4, material collected in channel 140 is dragged forward by moving walls 142 and 144 to material blocking end wall surface 146 of blocking member 148. As mentioned, the geometry of channel 140 is selected so that at any given rotor speed, collected material is efficiently pumped or dragged forward to blocking member 148. Material collected in channel 140 and blocked at surface 146 is discharged from the channel through a collection channel outlet. The collection channel outlet may be arranged to discharge material from collection channel 140 directly from the processor or collection channel material may be transferred to a processing passage such as an adjacent processing passage for discharge from the passage or for recycling with material in the processing passage.

Figure 5:
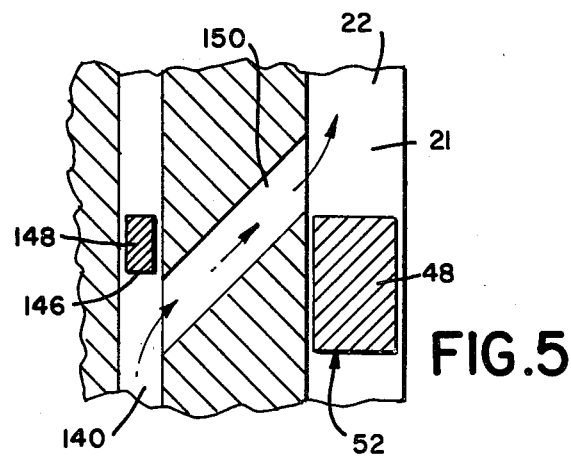
FIG. 5 is a simplified schematic view of the interconnection of the collection channel of FIG. 4 with a processing stage passage by means of a material transfer groove with arrows indicating flow direction of material from the channel to the passage.

A preferred arrangement for discharging material from channel 140 is shown in FIG. 5 where material collected at surface 146 is discharged from channels 140 through collection channel material transfer grooves 150. Transfer groove 150 is formed in coaxial surface 38 adjacent surfaces 146. The open ends of grooves 150 are disposed to receive material collected at surfaces 146 and to convey the received material over surfaces 20 for discharge to the inlet region of adjacent passages 22 or 28. As best shown in FIG. 5, the open end of transfer groove 150 extends parallel to the axis of rotor 12 in the region of channel 140 upstream of surface 146 then extends transversally to the axis of rotor 12 across surface 20 and then parallel to the axis of rotor 12 in the region of channel 21 (or 27) downstream of blocking member 48. When so arranged, transfer groove 150 provides an outlet for discharging material collected at surface 146 and an inlet for supplying the collected material to the low pressure, inlet region of passage 22 (or 28).

From the above description, it will be seen that the novel melting stages of this invention can provide additional processing surface area providing a special melting efficiency. The increase is achieved by a design providing relatively wide clearances 130 which permit material to freely pass over surface 20 between each melting passage and over surfaces 20 at end regions of the rotor portion carrying the melting passages. Collection channels are provided which are designed, arranged and adapted to collect material passing through clearances 130 near end regions of the rotor 12. The channels collect and remove material from the end regions and quickly pump the collected material to end wall surface 146 where the collected material is transferred to inlet 42 of end passages 22 and 28. Accordingly, the collection channels reduce and effectively control the potential for external leakage of material by continually collecting and removing material from the end regions of the rotor at a rate which effectively prevents collected material from reaching external clearance 132.

In addition to effectively controlling external leakage, the collection channels also contribute to improve overall melting efficiency of melting stages of this invention. In the described operation of the collection channels, collected material is designed to be recycled to inlets of end passages 22 and 28 where the melted material can be mixed with unmelted or partially melted material. This mixing or fusion of recycled collected melted material with unmelted or partially melted material at the inlet contributes to improved overall melting efficiency. The improved melting efficiency is a result of the viscous melted material penetrating between unmelted or partially melted material and accelerating deformation of unmelted or partially melted materials.

Figure 6:
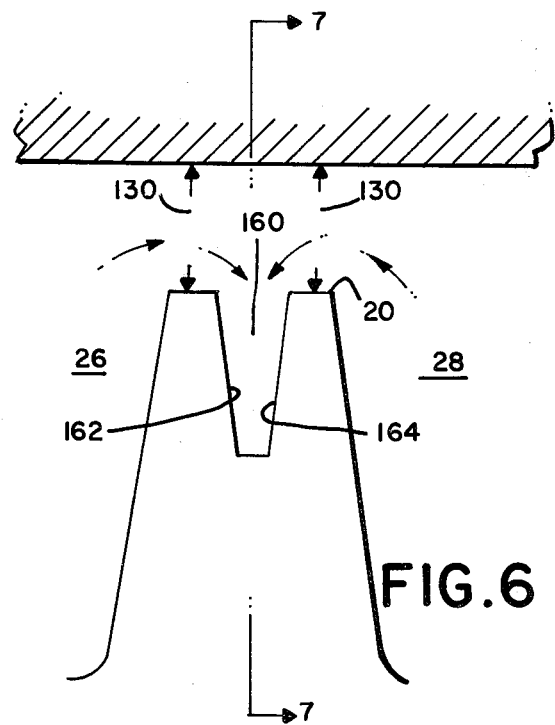
FIG. 6 is a cross-sectional view of a rotor section between passages of the processor stage of FIG. 1 and illustrates an embodiment of the invention in which the rotor carries an interchange material collection channel.
Figure 7:
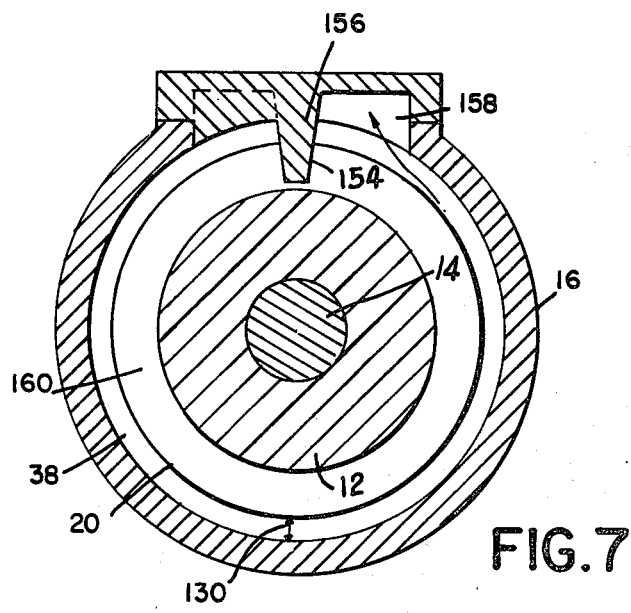
FIG. 7 is a simplified cross-sectional view of the embodiment of the invention shown in FIG. 6 and taken along line 7—7 of FIG. 6.
Figure 8:
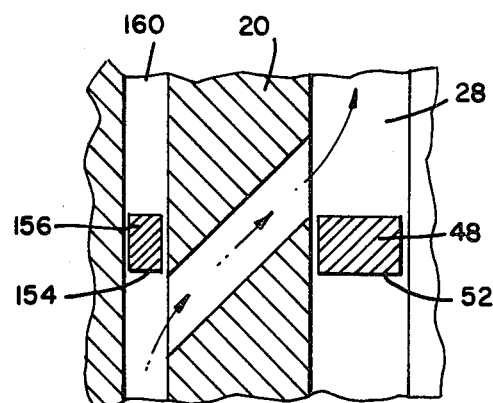
FIG. 8 is a simplified schematic view of the interconnection of the collection channel of FIG. 6 with a processing stage passage by means of a material transfer groove with arrows indicating flow direction of material from the channel to the passage.

FIGS. 6, 7 and 8 illustrate another aspect of the invention in which a material collection channel(s) is arranged on surface(s) 20 between adjacent melting passages. As shown in FIG. 6, material collection channel 160 having walls 162 and 164 is carried by surface 20 between passages 26 and 28. Additional collection channels 160 may be carried by surfaces 20 between other passages of the melt processing stage. Like channels 140, channel 160 is designed to provide efficient pumping for collected material and is of a geometry capable of effectively performing this function. As illustrated, material interchanged between passages 26 and 28 through clearance 130 is collected in channel 160 and rapidly dragged forward to material blocking end wall surface 154 of member 156 (FIG. 7). Material blocked at surface 154 is discharged from channel 160 through a suitable outlet. The outlet for channel 160 may be arranged so that material may be discharged directly from the processor or the outlet may be arranged to transfer the material to a melting passage for discharge from the passage or for recycling with material processed in the passage. As shown, in FIG. 8, material collected at surface 154 is preferably supplied to transfer groove 158 for transfer to an adjacent passage.

Transfer groove 158 is formed in coaxial surface 38 adjacent surface 154. The open end of groove 158 is disposed to receive material blocked and collected at surface 154 and to convey the received material over surface 20 for discharge to the inlet region of passage 28. As best shown in FIG. 8, the open end of groove 158 extends parallel to the axis of rotor 12 in the region of channel 160 upstream of surface 154 then extends transversely to the axis of rotor 12 across surface 20 and then parallel to the axis of rotor 12 across the region of adjacent passage 28 downstream of blocking member 48. The arrangement of material collection channel(s) on surface(s) 20 between adjacent melting passages reduces residence time for material in clearance 130 and provides more intensive mixing for material passed through clearance(s) 130.

Figure 9:
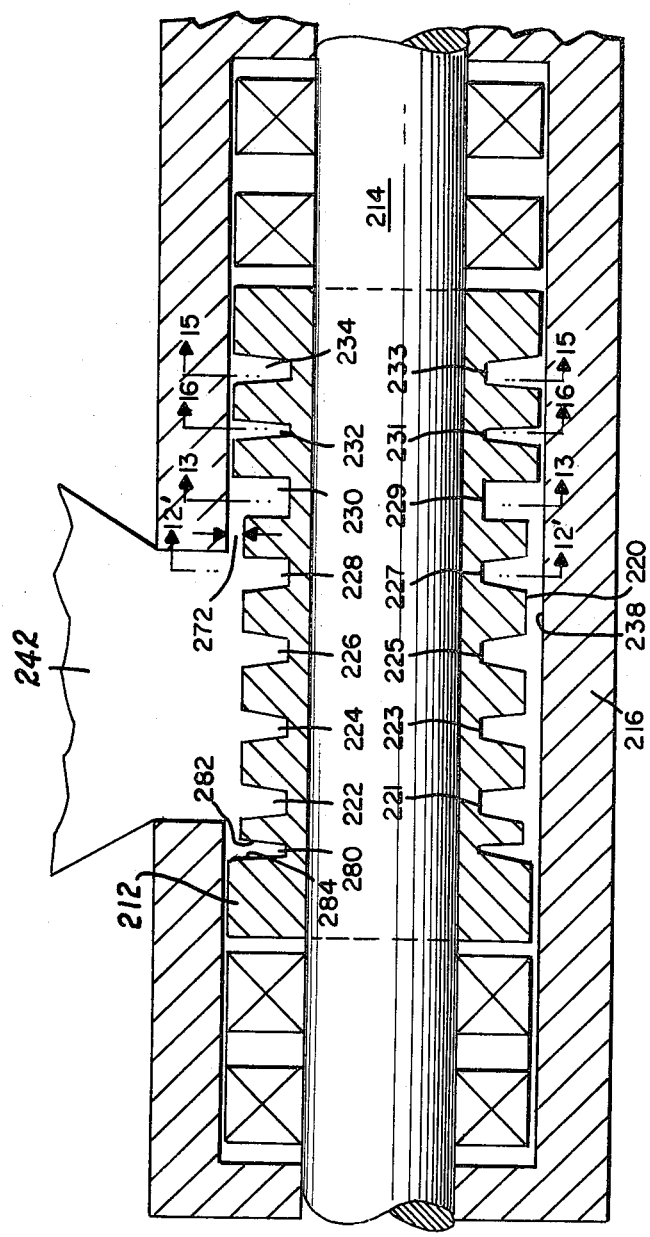
FIG. 9 is a cross-sectional view of a multi-stage rotary processor showing an arrangement of processing passages providing a processing stage of this invention, a second processing stage and a third processing stage.

FIGS. 9–16 illustrate an especially preferred multi-stage rotary processor using the novel, improved melting stage of this invention. As shown in FIG. 9, rotor 212 carries a plurality of processing passages which are designed to provide first, second and third processing stages. Processing passages 222, 224, 226 and 228 formed with channels 221, 223, 225 and 227 respectively provide the first stage which is a melting stage of this invention. The second stage includes inboard and outboard sections with passage 230 formed with channel 229 providing the inboard section while passage 234 formed with channel 233 provides the outboard section. The third stage is provided by passage 232 formed with channel 231 and is positioned between and separates the inboard and outboard sections of the second stage. As will be explained in detail later, the stages are interconnected by material transfer grooves formed in surface 238 and arranged so that material processed in one stage can be transferred to another. For purposes of illustrating a particularly preferred embodiment of the invention, the first stage of the illustrated multi-stage rotary processor involves a melting stage of the invention, the second stage is designed for mixing melting stage processed material and the third stage is designed for pressurizing and discharging second-stage processed material from the processor.

In the illustrated processor, surface 220 carrying the channels of the melting passages is spaced apart from surface 238 by clearance 272 which in melting stages of processors of this invention is about 0.250 inches or greater. Additionally, a collection channel 280 having walls 282 and 284 is arranged on surface 220 adjacent passage 222. Blocking member 286 (FIG. 11) providing blocking surface 288 is arranged with the stationary element to extend radially into collection channel 280.

Figure 10:
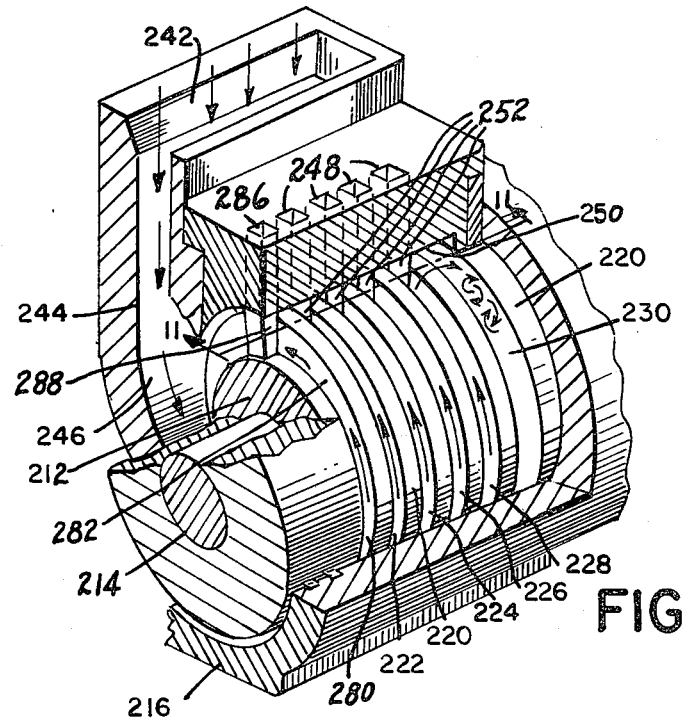
FIG. 10 is a perspective view of the multi-stage rotary processor of FIG. 9 which is partly in section with parts broken away.
Figure 12:
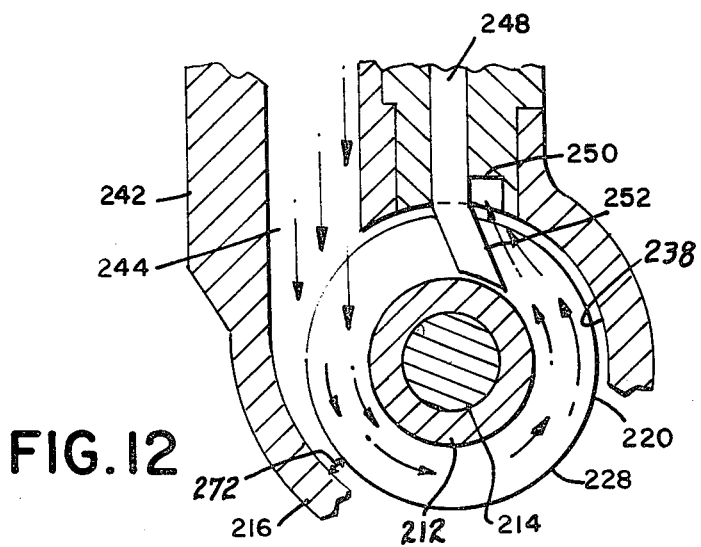
FIG. 12 is a simplified cross-sectional view of the rotary processor of FIG. 9 taken along line 12'—12' of FIG. 9.

In operation, material is supplied to the processor through inlet 242 and is forced by undercuts 244 into channels 221, 223, 225 and 227. The situation is shown in FIGS. 9, 10, 11 and 12. FIG. 10 illustrates a section of rotor 212 carrying passages 222, 224, 226 and 228 of the melting stage and the first passage 230 of the inboard section of the second stage. FIG. 12 illustrates passage 228 of the melting stage formed with channel 227 and has the same dimensions and arrangement of structural elements as the other melting stage passages 222, 224, and 226. Each passage of the melting stage includes a channel blocking member 248 arranged to communicate with each melting stage passage. Blocking member 286 (FIGS. 10 and 11) is also arranged near transfer groove 250 for supplying material blocked and collected at surface 288 to groove 250. Transfer groove 250 is preferably spaced apart from inlet 242 a major portion of the circumferential distance about the processing passages.

As shown, (FIGS. 10, 11 and 12), each blocking member 248 provides a material blocking and material collecting end wall surface 252 for each passage of the melting stage. Accordingly, the melting operation in the melting stage is substantially as described earlier with respect to the single stage processor of FIGS. 1–8. The processing surface area for melting includes the area defined by the channel side walls in generating relative movement as well as the area provided by surfaces 220 and 238 at clearances 272 and the melting stage provides efficient melting and intensive mixing for material processed in the melting stage.

Particularly preferred blocking members of melting stage passages of this invention are those described in abandoned U.S. patent application Ser. No. 971,332 which has been incorporated here by reference. Blocking members described in U.S. application Ser. No. 971,332 have a material blocking surface separated from a material collection surface by an extension having sides providing a melt pool space with the channel walls.

Figure 11:
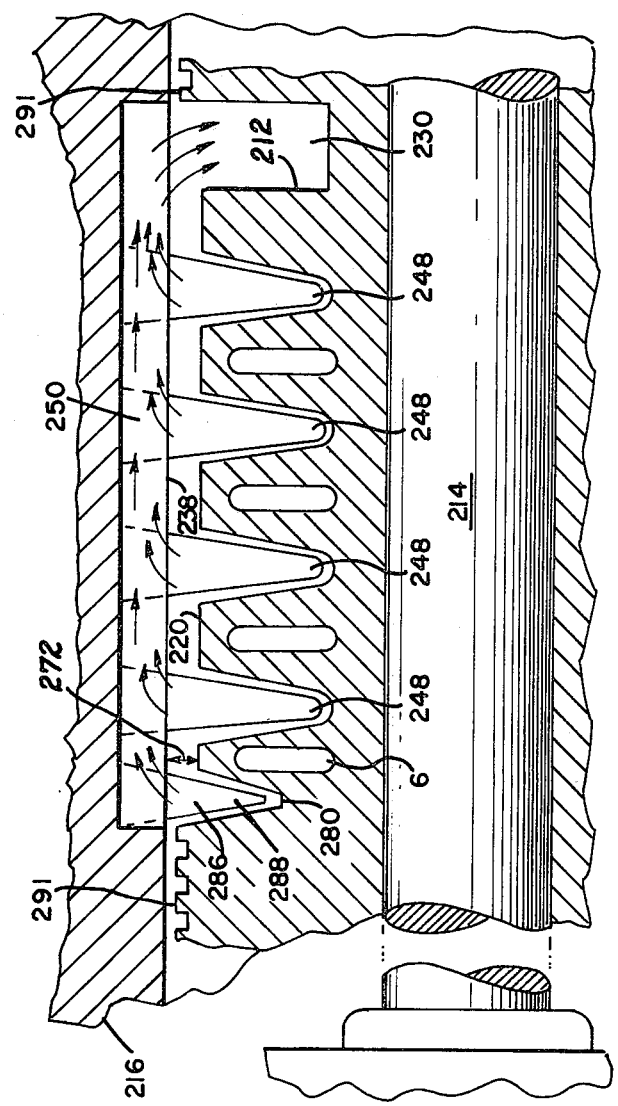
FIG. 11 is a simplified cross-sectional view of the multi-stage rotary processor of FIG. 10 taken along line 11—11 of FIG. 10.
Figure 13:
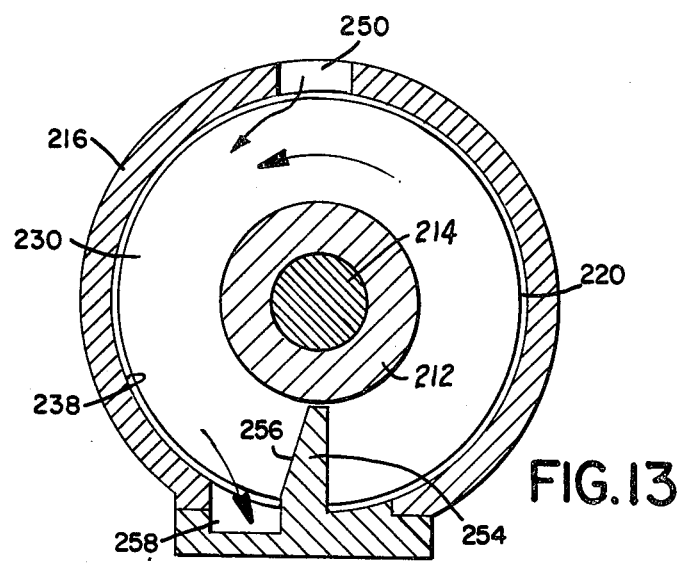
FIG. 13 is a simplified cross-sectional view of the rotary processor of FIG. 9 taken along line 13—13 of FIG. 9.

Material processed in the melting stage is discharged from each passage and material collected in collection channel 280 is also discharged through material transfer groove 250 (FIGS. 10 and 11). Transfer groove 250 is formed in coaxial surface 238 adjacent to and upstream of surface 252 of blocking member 248. Transfer groove 250 extends parallel to the axis of rotor 212 with the open end of groove 250 disposed to receive processed material collected at surface 288 and at surface 252 of each passage and to convey the received material over rotor surfaces 220 between collection channel 280 and channel 221 and between channels 223, 225 and 227 for discharge to inboard section, second-stage processing passage 230. As shown in FIGS. 10 and 11, the most outboard terminal portion of groove 250 provides an inlet for passage 230.

The melting stage illustrated in FIGS. 9, 10 and 11 has four processing passages of substantially identical shape and dimensions. More or less passages may be used and melt processing stage passages differing in shape, dimensions and geometry from other melting stage passages may also be used in the practice of the invention.

The second processing stage of the illustrated multi-stage processor includes inboard and outboard sections separated by at least one processing passage of the third stage. As shown in FIG. 9, passage 230 provides the inboard section of the second stage while passage 234 provides the outboard section. As shown in FIGS. 9, 10, and 11 a collection channel is not arranged on surface 220 between melt passage 228 and inboard section processing passage 230. Instead, the design shown permits material to pass from passage 228 over surface 220 to passage 230 and this passing of material occurs over substantially the whole circumferential portion of surface 220.

The material passed over surface 220 to passage 230 supplements the amount of material supplied to passage 230 from melting stage material transfer groove 250 and can substantially increase the overall feed rate of supply of melting stage material to inboard section passage 230. The increase in supply rate of melting stage material to inboard section passage 230 is an important feature contributing to improved efficiency of the illustrated multi-stage rotary processor. As shown in FIGS. 9 and 11, passage 230 has parallel side walls and is wider than melting stage passages 222, 224, 226 and 228. In the illustrated processor, passage 230 is assigned the function of mixing or homogenizing melting stage material and the geometry of passage 230 has been selected to effectively perform the assigned function.

The selected geometry of passage 230 however can establish a variance between the rate at which melting stage processed material is supplied to the inboard section passage 230 and the capacity of passage 230 to process and discharge material. This variance provides that the capacity for passage 230 to process and discharge melting stage material is greater than the rate at which the melting stage material is supplied to the passage. The variance or mismatch between the rate at which the inboard section passage receives material and the volume/rate capability of the passage to process and discharge material can cause seriously large pressure, flow and temperature fluctuations in the processing passages and particularly at the discharge of the processor. However, melting stages of this invention can be arranged with passages of a second processing stage in the manner shown to provide increased supply rates of melting stage material to the second processing stage passage thereby providing a more uniform flow rate of material through the passages. Additionally, the feed rate of material from passage 228 to passage 230 over surface 220 can be controlled and adjusted by selectively reducing the clearance between surface 238 and surface 220 separating passages 228 and 230.

Additional details relating to the above-discussed variance established by selected geometries of interconnected multi-stage processor passages can be found in commonly owned, copending application Ser. No. 336,920 filed on even date with this application by L. N. Valsamis and G. Donoian.

Referring again to FIGS. 10, 11 and 13, melting stage processed material is transferred by way of groove 250 to passage 230 of the inboard section of the second stage. In rotary processors of the invention, melting stage processed material is efficiently mixed in passage 230 by the relative movement established between material blocked by blocking member 254 and the moving channel walls of passage 230 which drag or carry the material forward to material blocking end wall surface 256. In the multi-stage processors of this invention, the blocking member(s) of the processing passage(s) of the second-stage inboard section (member 254—FIG. 13) is arranged about 180° from the circumferential position of first stage passage blocking members 248. Accordingly, in passage 230 material travels only approximately one-half a revolution through the passage before reaching blocking member 254. Material blocked and collected at surfaces 256 of member 254 is discharged from the passage through inboard section material transfer groove 258.

Figure 14:
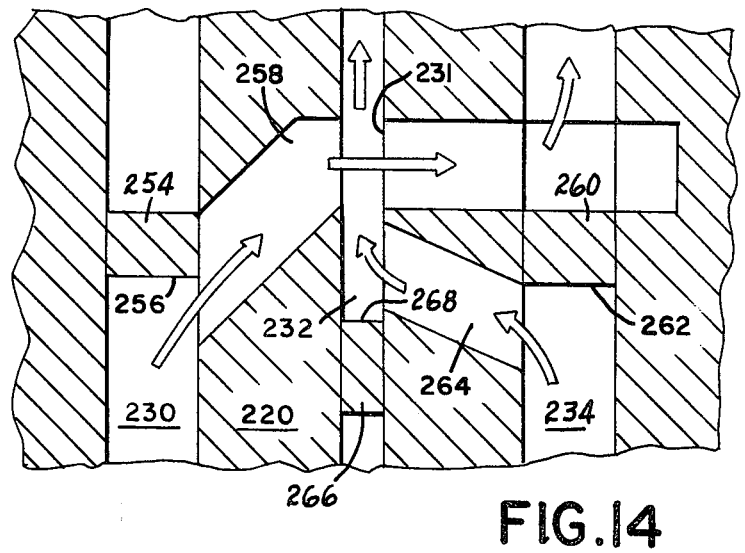
FIG. 14 is a simplified schematic view of the interconnection of processing passages of the multi-stage rotary processor of FIG. 9 by means of material transfer grooves with arrows indicating flow direction of material from one processing passage to another.

Transfer groove 258 is shown in FIG. 14 which is an idealized and simplified presentation with arrows indicating flow direction in material transfer grooves relative to blocking members arranged in passages of the inboard and outboard sections of the second stage and to a blocking member arranged in a third-stage passage. As shown, transfer groove 258 is formed in coaxial surface 238 and is designed, arranged and adapted to receive material collected at surface 256 and transfer the collected material from passage 230 to outboard stage passage 234. Essentially, the open end of transfer groove 258 may, as shown, extend parallel to the axis of rotor 212 from the region of passage 230 upstream of surface 256 then transversally to the axis of rotor 212 across surface 220 adjacent passage 232 and then parallel to the axis of rotor 212 across channel 231 of passage 232 and across surface 220 between passages 232 and 234 to the region of passage 234 downstream of blocking member 260. When so arranged, transfer groove 258 provides an outlet for discharging material from passage 230 of the inboard stage and an inlet for supplying material to passage 234 of the outboard section. It will be noted that material in transfer groove 258 is carried across open channel 231 of passage 232 separating passages 230 and 234. In operation, passage 232 is designed to be sufficiently filled and to generate high pressures so that leakage of material from transfer groove 258 to channel 231 is minimal.

As described in referenced U.S. Pat. No. 4,227,816 transfer groove 258 can be formed in removable flow director units which can be mounted in slots in housing 216 arranged to permit cooperation of the transfer groove with selected passages. Blocking members associated with the transfer groove can also be carried by the removable flow director unit.

The inboard section of the second stage illustrated and described includes one passage, but this preferred illustrated arrangement can be varied. For example, the inboard section can involve more than one passage and the shape, dimension and geometry of the passages can be the same or different. As illustrated, preferred second-stage inboard section passage(s) are those in which the passage(s) receiving first-stage processed material has a geometry providing a processing and discharge capacity which is greater than the rate at which material is supplied to the passage. However, for certain second-stage processing operations the selected geometry of the first-stage material receiving passage can provide a capacity which is equal to or less than the supply rate of material.

Figure 15:
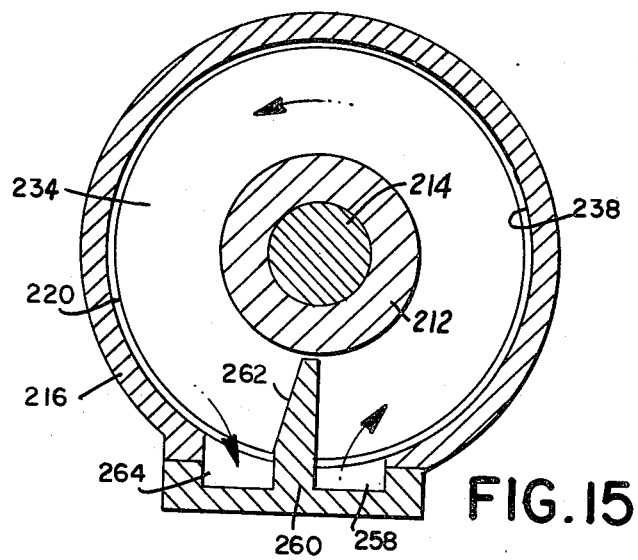
FIG. 15 is a simplified cross-sectional view of the rotary processor of FIG. 9 taken along line 15—15 of FIG. 9.

As shown in FIG. 15, material is supplied to the outboard section passage 234 of the second stage through transfer groove 258. The supplied material is dragged forward by the channel walls of passage 234 to blocking member 260 for collection at surface 262 for discharge through outboard section material transfer groove 264.

The second-stage outboard section shown in FIG. 9 consists of one passage, but rotary processors of this invention can include those in which more than one passage can be involved. As illustrated in FIG. 9, the processing passage of the second-stage outboard section differs somewhat in dimensions from the processing passages of the second-stage inboard section. In the illustrated processor, the passage channel 233 is narrower and the geometry has been selected to efficiently develop the pressure needed to supply passage 232. However, the number, shape, dimensions and geometry of the passage(s) of the outboard section can be the same or different relative to each other or relative to the inboard section passage(s).

Figure 16:
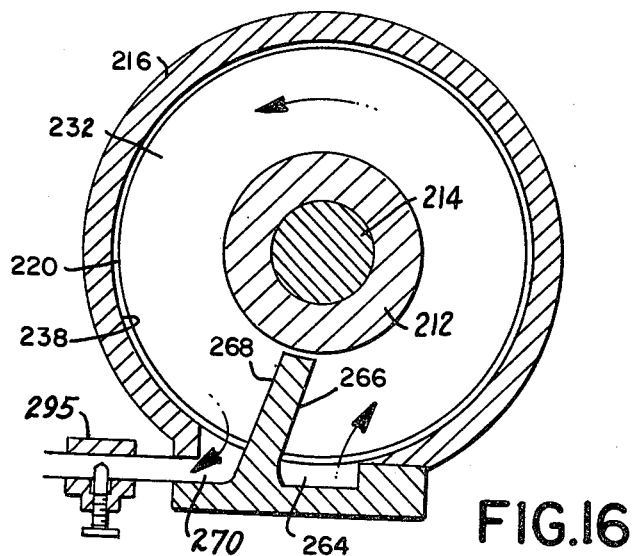

Referring again to FIG. 14, material processed in second-stage outboard section passage 234 is transferred to a processing passage of the third stage through material transfer groove 264. Transfer groove 264 is formed in coaxial surface 238 and has an open end which extends parallel to the axis of rotor 212 from the region of passage 234 upstream of surface 262 then extending transversally to the axis of rotor 212 across surface 220 and then parallel to the axis of rotor 212 to the region of passage 232 downstream of blocking member 266. Third-stage passage 232 (FIGS. 9 and 16) is primarily designed to function as a pressurizing or pumping stage for material supplied from the outboard section of the second stage. Accordingly, the geometry of the passage is selected to provide a passage having a capacity which remains at least partially filled at all times during operation and which is capable of generating high discharge pressures. As shown in FIG. 16, material supplied to the third-stage processing passage is dragged forward by the channel walls of passage 232 to blocking member 266. Material collected at surface 268 is discharged from the processor through outlet 270. Discharge control means shown as throttling valve 295 (FIG. 16) is arranged with outlet 270 to control discharge of material and/or to control discharge pressure.

FIG. 9 shows a third-stage processing section consisting of one passage, but more than one passage may be used. The passages may be connected in parallel or in series. For example, a plurality of third-stage processing passages may be interconnected so that material can be transferred from one third-stage processing passage to another for discharge from the processor. Alternatively, a plurality of third-stage processing passages can be interconnected so that material is fed to each passage and discharged from the processor from each passage.

Multi-stage processors of this invention present highly efficient polymeric processors providing special operational and design advantages. A multi-stage processor as described and illustrated presents such advantages as compact size, low power consumption and high production potential for efficiently melting, mixing and discharging a polymer melt product of uniformly high quality at substantially constant rate and pressure. For example, a multi-stage rotary processor of the type described with reference to FIGS. 9–16, has been designed to process a variety of polymeric materials. The designed processor includes a rotor having an OD of 14" which carries an arrangement of processing passages as shown in FIG. 9 interconnected by material transfer grooves. The material transfer grooves are formed in the coaxial surface of the stationary housing in substantially the same arrangements shown in FIG. 14.

The melting stage passages of the designed processor include four wedge-shaped channels as shown in FIG. 9. Each channel has a maximum width of 1", a minimum width of 0.65" and a height of 2.45". The surface 220 separating each melt processing channel has a width of 1". The clearance 272 between surface 220 of rotor 212 carrying the four wedge-shaped channels and surface 238 is 0.25". Additionally, a collection channel 280 is arranged on surface 220 carrying the melting stage channels adjacent the channel most remote from the second-stage passage. The collection channel 280 is wedge-shaped and has a maximum width of 0.25" and a height of 2.45". The surface 220 between the collection channel and the adjacent melt processing channel is 1". The second-stage inboard section passage includes one rectangular channel having a width of 1" and a height of 2.45". The surface 220 between the second-stage channel and the adjacent melt processing channel has a width of 1". The second-stage outboard section passage of the processor includes one rectangular channel having a width of 0.5" and a height of 2.45". The third-stage processing passage includes one channel having a maximum width of 0.25" and a height of 2.45". Surface 220 separating the inboard section channel and the third-stage channel has a width of 1.5" while the width of surface 220 between the third-stage channel and the outboard stage channel is 1.5".

In a typical processing operation of a multi-stage rotary processor of the described design, polymeric material may be fed to the four passages of the first stage of the heated processor at a rate of 2000 lbs/hr. The processor rotor 212 may be rotated at a speed of 150 RPM. Temperature of the melted material collected for transfer by material transfer groove 250 may be between 250°–300° F. while pressure generated at end wall surfaces 252 of the first-stage passages may be 1000 to 1500 psi. Collected first-stage processed material may be supplied to the first passage of the inboard section of the second stage at a rate of 2000 lbs/hr. The temperature of material processed (mixed) in the inboard section may be 330°–340° F. while pressures of 200–250 psi may be generated at end wall surface 256. Temperature of material processed in the outboard section of the second stage may be 350°–370° F. while a pressure of 200–250 psi may be developed at end wall surface 262. Material processed in the third stage may be discharged from the processor at a substantially uniform temperature of between 400°–450° F., at a substantially constant rate of 2000 lbs/hr. and at a substantially constant pressure between 2000–3000 psi.

In addition to providing an especially effective capability for processing material at a substantially constant discharge rate, temperature and pressure, the design of multi-stage rotary processors of this invention provides special advantages in minimizing external leakage from the processor. Normally, seals of the type described in U.S. Pat. No. 4,300,842 are employed to control external leakage. Such seals (291 FIG. 11) are arranged on surface 220 near each end of rotor 212 to control leakage of material from the processor through the clearance between rotor end surfaces 220 and surface 238. Preferred multi-stage processors of this invention include such sealing means to control external leakage.

Additionally, such sealing means can be arranged on surface 220 between processing passages to control internal leakage from one passage to another through the clearance between surfaces 220 and 238. The preferred processors of this invention also include such internal leakage control seals. Accordingly, in the illustrated processor (FIG. 9) such seals would be arranged on surface 220 between inboard section passage 230 and third-stage passage 232 and on surface 220 between passage 232 and outboard section passage 234.

The design of multi-stage rotary processors of this invention however inherently reduces the potential for external leakage and provides an especially effective degree of control for external leakage. As already described, a leakage collection channel 280 (FIG. 9) is arranged at one end of the melting stage to effectively reduce and control external leakage from the melting stage end of the processor. However, as also described, in processors of this invention, the high-pressure pumping passage is arranged between inboard and outboard section passages which are designed to operate at relatively low pressures. Accordingly, at the end of the processor opposite the melting stage, the most outboard passage (234, FIG. 9) generates relatively low pressures thereby reducing the potential for and providing control over external leakage. Additionally, the amount of material available for external leakage is minimized by the described arrangement of the high-pressure processing passage between inboard and outboard section processing passages operating at relatively lower pressures. Material which leaks from the high-pressure processing passage to the inboard or outboard passages can be collected in these inboard and outboard section passages and recycled to the high-pressure passage for discharge. Accordingly, external leakage from the illustrated multi-stage rotary processor is effectively controlled. At the melting stage end of the processor the leakage from the illustrated multi-stage rotary processor is effectively controlled by the the leakage collection channel which continually collects and reduces the amount of material available for external leakage. At the other end, the arrangement of the third-stage passage relative to the inboard and outboard passages operates to effectively control end leakage.

Additional details relating to the advantages derived from the arrangement of the third stage passage between inboard and outboard section passages operating at relatively low pressures can be found in commonly owned, copending application, Ser. No. 336,607 filed on the same day as this application by L. N. Valsamis, J. C. Yang and G. Donoian.

From the above description it should be apparent that rotary processors including the novel melting stage of this invention present many distinctive and unexpected advantages. The relatively wide clearances provided between the surface of the rotor carrying the melting channels permits free interchange of material from passage to passage and provides intensive mixing for material processed in the melting stage. Further, the clearances provide additional melt processing surface area for the processor and the additional melt processing surface area presents highly efficient conditions for melting and mixing processed materials. The effective utilization of relatively large clearances is achieved by the arrangement, design and cooperation of a collection channel capable of effectively controlling external leakage from the processor. The collection channel effectively collects and rapidly removes melted material from end regions of the melt processing stage and preferably recycles collected melted material to low-pressure, inlet regions of melt processing passages. The mixing of melted material with unmelted material in the inlet regions further contributes to improved overall melting efficiency for the melt processing stage.

The melt processing stage design is also particularly adaptable for connection with a further processing passage and can be arranged to increase the feed rate of melt stage processed material to a second-stage passage for further processing. The increased feed rate capability is of special importance in multi-stage rotary processors in which the interconnected further processing passage has a capacity for processing and discharging material at a rate which is greater than the rate at which melt stage processed material is supplied to the passage. The increased feed rate is a factor which promotes improved uniformity of flow, temperature and discharge pressures during processor operation despite the potential for severe fluctuations because of the variance between capacity and supply rates. Accordingly, the invention presents to the art novel rotary processors having unexpectedly improved overall processing performance characteristics as compared to rotary processors known to the art at the time the invention was made.

We claim:

1. In a rotary processor comprising a rotatable element carrying a plurality of processing channels extending inwardly from the rotor surface and a stationary element having a coaxial closure surface operationally arranged with said channels to provide a plurality of enclosed processing passages and where each processing passage includes inlet and outlet means and a material blocking end wall surface providing member associated with the stationary element and arranged so that material fed to the passage through the inlet can be blocked at the end wall surface for processing and/or discharge from the passage through the outlet, the improvement where the rotor surface carrying the processing channels is spaced apart from the closure surface by a relatively wide clearance adapted to permit interchange of substantial material from passage to passage about substantially the entire circumference of each passage and where a collection channel including opposed walls carried by the surface rotor and extending inwardly from the rotor surface is arranged adjacent an end processing channel to collect material passing through the clearance between the closure surface and the rotor surface separating the collection channel and the adjacent end processing channel and outlet means and a blocking member providing a material blocking end wall surface associated with the stationary element and arranged with the collection channel so that material collected in the collection channel can be blocked for discharge from the collection channel.

2. A rotary processor of claim 1 where collection channels are arranged adjacent each end processing passage.

3. A rotary processor of claim 1 including collection channel material transfer grooves formed in the closure surface and arranged and adapted with each collection channel to receive material collected and blocked at the end wall surface of the collection channel for transfer to the inlet region of an adjacent processing passage.

4. A rotary processor of claim 1 including means to heat said processing passages.

5. A rotary processor of claim 1 where the outlet means of the processing passages and the outlet means of the collection channels are arranged in axial alignment and are spaced from the inlet means of the processing passages a major portion about the circumference of the processing passages.

6. A processor of claim 1 where the relatively wide clearance is about 0.25 inches or greater.

7. A rotary processor of claim 1 including a material collection channel carried by the rotor surface between adjacent processing channels and a material blocking end wall surface providing member and outlet means associated with the stationary element and arranged with the interchange material collection channel so that material collected in the channel can be blocked for discharge from the channel.

8. A processor of claim 1 where the wall of the collection channel most remote from the end processing channel is of a height greater than the height of the collection channel wall closest to the end processing channel and terminates at end rotor surface positions providing a close clearance between the end rotor surface portions and the closure surface.

9. A processor of claim 8 where sealing means are arranged at the close clearances between end rotor surface portions and the closure surface.

10. A multi-stage rotary processor comprising a rotatable element carrying a plurality of processing channels and a stationary element having a coaxial closure surface operationally arranged with said channels to provide enclosed processing passages and where the processing passages provide a plurality of interconnected processing stages including a first processing stage and second processing stage for receiving first stage processed material, said first processing stage arranged at one end of the rotor and including a plurality of processing passages comprising an inlet, a first-stage material transfer groove and a material blocking end wall surface providing member associated with the stationary element and arranged so that material fed to the passage through the inlet can be blocked at the end wall surface and supplied to the transfer groove for transfer to at least one passage of the second processing stage which includes outlet means and a material blocking end wall providing surface so that first stage processed material supplied to the second stage passage can be blocked at the end wall and discharged from the second stage passage and where the rotor surface carrying the first stage processing channels is spaced apart from the closure surface by a relatively wide clearance adapted to permit interchange of substantial material from passage to passage about substantially the entire circumference of each passage and a collecting channel including opposed side walls carried by the rotor surface and extending inwardly from the rotor surface, said collection channel being arranged adjacent the end first stage processing channel most remote from the second-stage processing passage channel and adapted to collect material passing through the clearance between the closure surface and the rotor surface separating the collection and end processing channels and, outlet means and a blocking member providing a material blocking end wall surface associated with the stationary element and arranged with the collection channel and with said material transfer groove so that material collected in the collection channel can be blocked for discharge from the collection channel through said material transfer groove.

11. A multi-stage rotary processor of claim 10 including means to heat at least the processing passages of the first stage.

12. A multi-stage rotary processor of claim 10 where the first stage material transfer groove is spaced apart from the inlet of the first stage processing passages a major portion about the circumference of the first stage processing passages.

13. A processor of claim 10 where the passages of the first stage are formed with wedge-shaped channels.

14. A processor of claim 10 where the passage of the second stage receiving first stage processed material has a selected geometry providing a capacity for the passage to process and discharge first stage processed material at a volume rate greater than the volume rate of material supplied to the second passage.

15. A processor of claim 10 where the blocking member of the second stage passage is disposed about 180° from the circumferential portion of the blocking members of the passage of the first processing stage.

16. A processor of claim 10 where the second stage processing passage is interconnected to one or more other second stage processing passage(s).

17. A processor of claim 10 where the second stage processing passage is interconnected to one or more other second stage processing passage and the other second stage processing passage is interconnected to a third stage processing passage.

18. A processor of claim 17 where the third stage processing passage is positioned between the second processing stage passage receiving first stage processed material and said one or more interconnected second stage processing passage.

19. A processor of claim 18 including means to control discharge of material from the third stage processing passage.

* * * * *

UNITED STATES PATENT OFFICE
CERTIFICATE OF CORRECTION

Patent No. 4,389,119      Dated June 21, 1983

Inventor(s) Lefteris N. Valsamis, Zehev Tadmor

It is certified that error appears in the above-identified patent and that said Letters Patent are hereby corrected as shown below:

Column 2, line 8, after "between" delete - passage - and insert - passages -

Column 3, line 59, after "46" insert - extend -

Claim 18, Column 16, line 49, after "more" insert - other -

Signed and Sealed this

Eighteenth Day of October 1983

[SEAL]

Attest:

GERALD J. MOSSINGHOFF

Attesting Officer     Commissioner of Patents and Trademarks